Patented May 6, 1924.

1,493,100

UNITED STATES PATENT OFFICE.

CHARLES BRAMSON, OF JOLIET, ILLINOIS.

TREATING MINERAL PHOSPHATES.

No Drawing.   Application filed May 16, 1923.   Serial No. 639,457.

*To all whom it may concern:*

Be it known that I, CHARLES BRAMSON, a citizen of the United States of America, residing at Joliet, in the county of Will and State of Illinois, have invented certain Improvements in Treating Mineral Phosphates, of which the following is a specification.

This invention relates to a new and useful process for the recovery of the waste product occurring in the manufacture of phosphate salts and commercial phosphoric acid.

In order to be able to use crude phosphoric acid obtained from rock phosphate for the manufacture of phosphate salts, such as mono-calcium phosphate, di-calcium phosphate, sodium phosphate, etc., or commercially pure phosphoric acid, it must be first purified from its iron, aluminium salts and fluorides.

This is usually done by the well known process of partially neutralizing the crude phosphoric acid with marble dust or lime water until practically all the iron, aluminium and fluorides are precipitated out. This precipitate which in the plant goes under the name of "fertilizer" or "press cake" is washed, dried and sold to fertilizer concerns for its citrate-soluble content of anhydrous phosphoric acid—$P_2O_5$, for a price not much above the handling and drying the same.

This material analyzes when dry about 50% di-calcium phosphate, 17–26% iron and aluminium phosphate, 10% calcium fluoride, with some calcium sulfate, silica and moisture 10%. Before being dried it runs about 60–70% moisture, and presents many difficulties in drying and handling it. A too high temperature cannot be used, as it is likely to change the dicalcium phosphate into pyrophosphate i. e. make it citrate-insoluble; a too big draft is objectionable, the product, being extremely light, will go up in the air.

It usually presents a loss from 25% to 30% of the original rock phosphate for the plant use.

The purpose of the present improvement is to cut out practically all this loss, and the same is based upon facts as follows:—

Recently precipitated calcium fluoride, which is readily soluble in moderately dilute sulfuric or phosphoric acids, after being heated to a red heat, from 700° to 900° C., is practically insoluble in the latter. The same is true with ferric or aluminium oxides, after being heated, when no reducing agents are present, will not be attacked by sulfuric or phosphoric acids. Further, if iron and aluminium phosphates are treated with lime and heated, tri-calcium phosphate and iron and aluminium oxides are formed—thus—

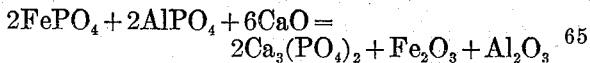

However, upon calcining dicalcium phosphate it changes into the corresponding pyrophosphate:

which is difficultly soluble in sulfuric or phosphoric acids. Tri-calcium phosphate, on the other hand, when calcined does not alter and its solubility in acids is the same as before.

In practice, I take advantage of these facts in manner as follows: The washed wet "press cake" or "fertilizer" is brought back to the mixing tank, an excess of lime water is added until all the dicalcium phosphate is changed into tri-calcium phosphate and there is enough lime to take cars of iron and aluminium phosphates in the future operation. Then the dewatered material is fed into a kiln or furnace and calcined, where the above mentioned reactions take place. The iron and aluminium phosphates react with the excess of lime to form the corresponding insoluble oxides, the calcium fluorides are ignited and become insoluble. Then the calcined product is ground and treated with sulfuric acid in the usual manner. All the anhydrous phosphoric acid, now in the form of tri-calcium phosphate goes in solution while the impurities, calcium fluoride, iron and aluminium oxides stay undissolved.

I am aware that it is not broadly new to heat iron and aluminum phosphates together with lime to change the same into their respective oxides and tricalcium phosphates.

Having thus fully described my invention what I claim as new and desire to secure by Letters Patent, is:—

The herein described process of treating the washed waste product obtained in the purification process of crude phosphoric acid from rock phosphates, which consists in the addition to the waste product an excess of lime, and subsequently drying and calcining the product.

Signed at Chicago, Illinois, this 14th day of May, 1923.

CHARLES BRAMSON.